S. C. PECKHAM.
PEANUT ROASTING DEVICE.
APPLICATION FILED JAN. 12, 1917.
1,275,085.
Patented Aug. 6, 1918.
2 SHEETS—SHEET 1.
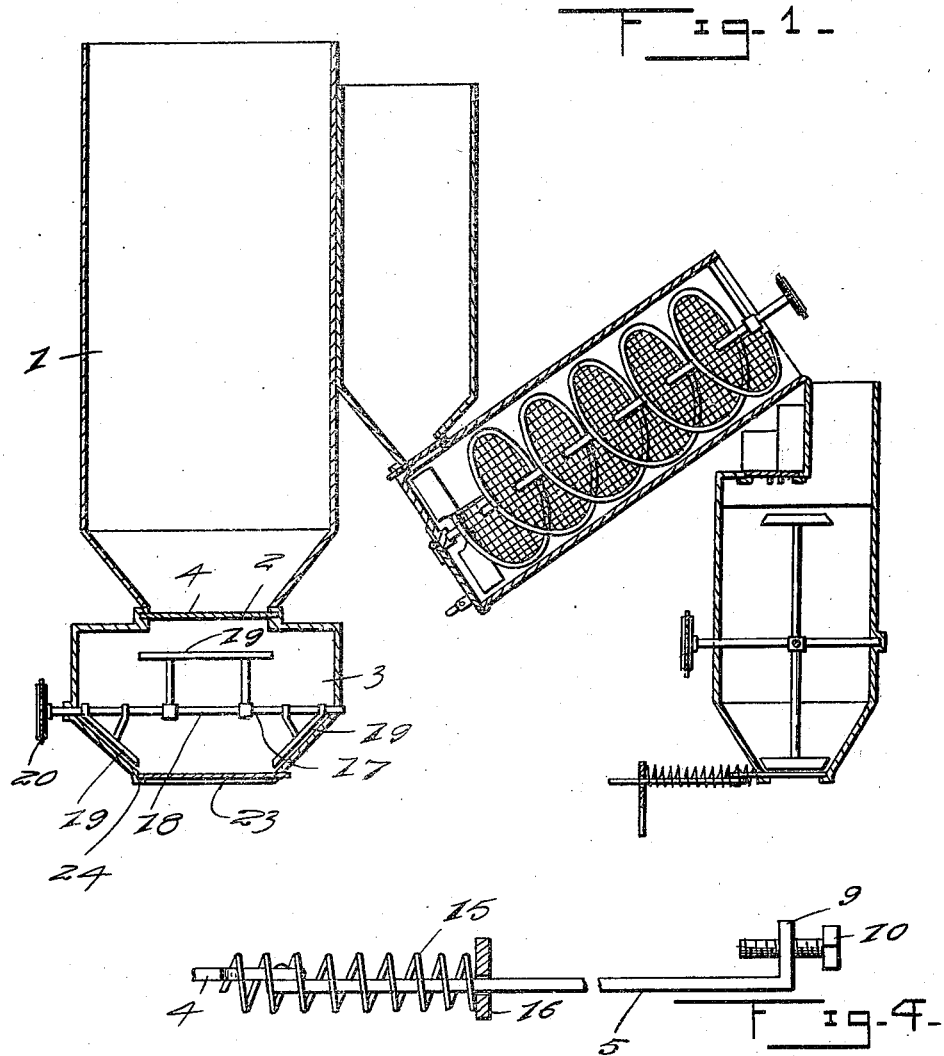
Inventor
S. C. Peckham

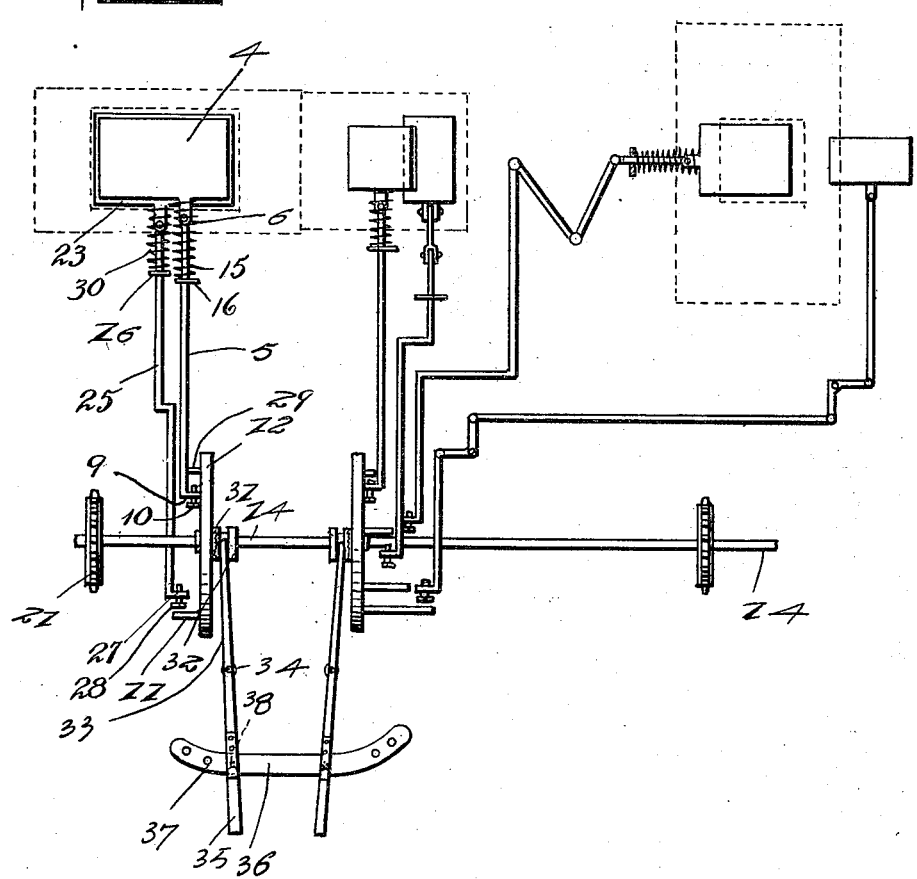
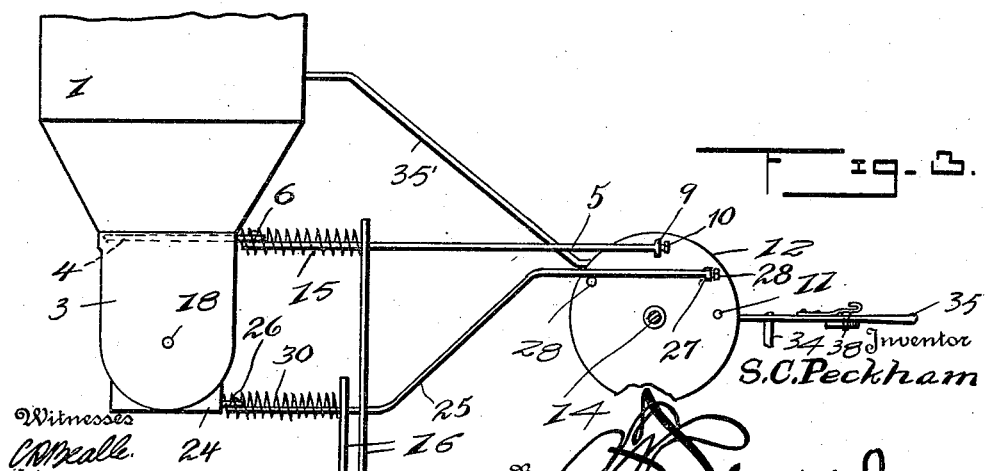

UNITED STATES PATENT OFFICE.

SAMUEL C. PECKHAM, OF MEXIA, TEXAS, ASSIGNOR OF ONE-EIGHTH TO MERION ADAMS, OF MEXIA, TEXAS.

PEANUT-ROASTING DEVICE.

1,275,085.   Specification of Letters Patent.   Patented Aug. 6, 1918.

Application filed January 12, 1917. Serial No. 142,039.

*To all whom it may concern:*

Be it known that I, SAMUEL C. PECKHAM, a citizen of the United States, residing at Mexia, in the county of Limestone and State of Texas, have invented certain new and useful Improvements in Peanut-Roasting Devices; and I do hereby declare the following to be a full, clear, and exact description of the invention, such as will enable others skilled in the art to which it appertains to make and use the same.

This invention relates to a device for roasting peanuts.

An object of the invention is to provide a device as specified which includes a retaining hopper for the unroasted peanuts, and a roasting chamber positioned beneath the hopper, which has communication with the peanut retaining hopper through a slidable door, and further to provide means for automatically operating said door at predetermined times for allowing peanuts to pass out of the hopper into the roasting chamber, and out of the roasting chamber into any suitable display device.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a vertical sectional view through the improved machine.

Fig. 2 is a plan view of the door operating mechanism.

Fig. 3 is a fragmentary end view.

Fig. 4 is a detail view illustrating a part of the mechanism for automatically controlling the operation of the doors of the device.

Referring more particularly to the drawings, 1 designates the retaining hopper for unroasted peanuts which hopper has communication through an opening 2 with a roasting chamber 3 which may be heated in any desired manner for roasting the peanuts. The opening 2 is normally closed by a sliding door 4, which has a rod 5 connected thereto through the medium of an ear 6 which is formed upon the door 4. The rod 5 has its outer end bent inwardly as shown at 9 and a thumb screw 10 is adjustably carried by the angled end. The thumb screw 10 has its inner end positioned in the path of a pin 11 which is carried by and projects laterally from one face of a disk 12. The disk 12 is rotatably mounted upon the shaft 14, which shaft may be rotated in any suitable manner so that during the rotation of the shaft, the pin 11 will strike the inner end of the thumb screw 10 and move the arm 5 outwardly for moving the sliding door 4 partially open to permit peanuts to fall into the chamber 3. A spring 15 is coiled about the rod 5 and has one of its ends engaging the bearing 16 which slidably supports the rod 5 and the other end engaging the outer edge of the door for closing the door after the pin 12 and the thumb screw 11 have moved out of engagement with each other during the rotation of the disk 13.

The roasting chamber 3 has an agitator 17 positioned therein which comprises a shaft 18 and a plurality of agitating blades which stir the peanuts while they are within the chamber, and thus insures a uniform roasting of all of the peanuts. The shaft 18 has a sprocket 20 mounted thereon, which may be operatively connected to a sprocket 21 carried by the shaft 14 through the medium of an ordinary sprocket chain. The outlet of the roasting chamber 3, which is positioned at the bottom of the same is closed by a door 23, which door is also slidably supported by suitable guideways 24 formed along the edges of the outlet opening. The door 23 has a rod 25 connected thereto, through the medium of an ear 26 which is formed upon the door. The rod 25 has its end 27 angled similarly to the angled end 9 of the rod 5, and a set screw 28 is carried by the angled end 27 and positioned in the path of a pin 29 which pin is carried by the disk 12. The pin 29 is positioned so that it will operate the door 23, a sufficient time before the door 4 is operated to allow all of the peanuts to pass out of the roasting chamber, and the door 23 to be closed by the action of a spring 30 which is coiled about the rod 25, before the door 4 is opened to allow unroasted peanuts to pass into the roasting chamber.

The disk 12 is loosely mounted upon the shaft 14 and it has a clutch section 31 carried thereby which is adapted for coaction with a clutch section 32, the clutch section 32 is feathered upon the shaft 14, and it has a hand lever 33 connected thereto. The hand lever 33 is pivotally mounted as shown at 34 so that upon pivotal movement of the lever it will move the clutch section 32 into and out of engagement with the clutch section 31, for controlling the rotation of the disk 12 by the rotation of the shaft 14, and consequently control the operation of the sliding doors of the peanut roasting structure as desired. The lever 33 has its handled end 35 positioned for movement over the upper surface of a bar 36, which bar is provided with a plurality of openings 37. A pin, as indicated at 38, may be carried by the hand lever 33, for extending into one of the openings 37 for holding the lever 33 against accidental pivotal movement.

In the operation of the improved machine, the hopper 1 is filled with unroasted peanuts, the door 4 will be opened by the rotation of the disk 12, in the manner heretofore described for allowing a limited quantity of peanuts to fall into the roasting chamber 3. The peanuts in the roasting chamber 3 are roasted owing to the fact that this chamber may be heated in any suitable manner and they will be thoroughly stirred or agitated while within the chamber by the agitator structure 17. When the peanuts have been sufficiently roasted the door 23 will be opened in the manner heretofore described allowing the roasted peanuts to pass out of the roasting chamber into any suitably type of display device after which the spring 30 will force the door 23 into a closed position and the disk 12 will open the door 4, allowing a fresh lot of peanuts to pass into the roasting chamber.

From the foregoing description taken in connection with the accompanying drawings, the advantages of construction and of the method of operation of the improved peanut treating device will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a device as set forth, the combination of a raw peanut retaining hopper, a roasting hopper, an agitator positioned within said roasting hopper, a slidable door controlling the communication between said first named hopper and said roasting hopper, and means for opening said door at predetermined times.

2. In a device as set forth, the combination of a raw peanut retaining hopper, a roasting chamber having communication with said hopper, an outlet opening for said roasting chamber, slidable doors controlling the outlet of peanuts out of said roasting chamber and the passage of peanuts from said first named hopper into said chamber, means for opening said doors at predetermined times, said means arranged for opening the outlet door of the roasting chamber to allow the peanuts to pass therefrom prior to the opening of the door for permitting peanuts to pass from the hopper into the roasting chamber.

In testimony whereof I affix my signature in presence of two witnesses.

SAMUEL C. PECKHAM.

Witnesses:
H. L. HALL,
E. WINSTON.

Copies of this patent may be obtained for five cents each, by addressing the "Commissioner of Patents, Washington, D. C."